(12) United States Patent
Suzuki et al.

(10) Patent No.: US 10,525,661 B2
(45) Date of Patent: Jan. 7, 2020

(54) NONWOVEN FABRIC AND REINFORCING LAMINATE

(71) Applicant: JXTG Nippon Oil & Energy Corporation, Tokyo (JP)

(72) Inventors: Tokuhito Suzuki, Tokyo (JP); Takashi Onodera, Tokyo (JP); Jun Yamada, Tokyo (JP)

(73) Assignee: JXTG Nippon Oil & Energy Corporation (JP)

(*) Notice: Subject to any disclaimer, the term of this patent is extended or adjusted under 35 U.S.C. 154(b) by 0 days.

(21) Appl. No.: 15/029,948

(22) PCT Filed: Oct. 7, 2014

(86) PCT No.: PCT/JP2014/076836
§ 371 (c)(1),
(2) Date: Apr. 15, 2016

(87) PCT Pub. No.: WO2015/056607
PCT Pub. Date: Apr. 23, 2015

(65) Prior Publication Data
US 2016/0229152 A1 Aug. 11, 2016

(30) Foreign Application Priority Data
Oct. 18, 2013 (JP) .................................. 2013-217739

(51) Int. Cl.
*B32B 5/02* (2006.01)
*B32B 27/08* (2006.01)
(Continued)

(52) U.S. Cl.
CPC .............. *B32B 5/022* (2013.01); *B32B 3/266* (2013.01); *B32B 5/028* (2013.01); *B32B 5/12* (2013.01);
(Continued)

(58) Field of Classification Search
CPC ......... B32B 27/00; B32B 27/06; B32B 27/08; B32B 27/32; B32B 27/327; B32B 27/02;
(Continued)

(56) References Cited

U.S. PATENT DOCUMENTS 5,032,442 A * 7/1991 Yamazaki .............. D04H 13/02
428/105
5,645,933 A * 7/1997 Sakazume .............. D04H 13/02
428/134
(Continued)

FOREIGN PATENT DOCUMENTS

AU 469682 B2 * 2/1976 ............. D04H 13/02
GB 1386438 A * 3/1975 ............. D04H 13/00
(Continued)

OTHER PUBLICATIONS

Machine translation (J-PlatPat) of JP 2004-216701 A. Translated Oct. 13, 2017.*
(Continued)

*Primary Examiner* — Maria V Ewald
*Assistant Examiner* — Ethan A. Utt
(74) *Attorney, Agent, or Firm* — Lerner, David, Littenberg, Krumholz & Mentlik, LLP

(57) ABSTRACT

In a nonwoven fabric, uniaxially oriented bodies each including a thermoplastic resin layer and first and second adhesive layers respectively stacked on both surfaces of the thermoplastic resin layer and having melting points lower than that of a thermoplastic resin constituting the thermoplastic resin layer are warp-weft laminated with the first or second adhesive layer interposed between the uniaxially oriented bodies in such a manner that orientation axes thereof intersect each other. The nonwoven fabric has a mass per unit area of 5 to 13 g/m², a layer composition ratio of the first adhesive layer, the thermoplastic resin layer, and the (Continued)

second adhesive layer in each of the uniaxially oriented bodies is 20/60/20 to 30/40/30, and an average value of bending resistances by a cantilever method is less than or equal to 50 mm.

5 Claims, 7 Drawing Sheets

(51) Int. Cl.
    B32B 27/32      (2006.01)
    D04H 13/02      (2006.01)
    B32B 27/06      (2006.01)
    B32B 7/027      (2019.01)
    B32B 5/12       (2006.01)
    B32B 5/26       (2006.01)
    B32B 3/26       (2006.01)

(52) U.S. Cl.
    CPC .............. B32B 5/26 (2013.01); B32B 7/027
        (2019.01); B32B 27/06 (2013.01); B32B 27/08
        (2013.01); B32B 27/32 (2013.01); D04H
        13/02 (2013.01); B32B 2262/0253 (2013.01);
        B32B 2307/516 (2013.01); B32B 2323/043
        (2013.01); B32B 2323/046 (2013.01); B32B
        2439/00 (2013.01); Y10T 428/2495 (2015.01);
        Y10T 428/24273 (2015.01); Y10T 428/24322
        (2015.01); Y10T 428/24942 (2015.01); Y10T
        428/24959 (2015.01)

(58) Field of Classification Search
    CPC .............. B32B 27/12; B32B 2250/242; B32B
        2250/24; B32B 2250/40; B32B 2250/00;
        B32B 2250/03; B32B 2250/05; B32B
        2250/20; B32B 2250/02; B32B 2250/04;
        B32B 3/24; B32B 3/26; B32B 3/266;
        B32B 3/00; B32B 3/10; B32B 3/12;
        B32B 5/00; B32B 5/02; B32B 5/022;
        B32B 5/028; B32B 5/12; B32B 5/22;
        B32B 5/24; B32B 5/26; B32B 7/00;
        B32B 7/02; B32B 7/027; B32B 7/03;
        B32B 7/035; B32B 7/04; B32B 7/05;
        B32B 7/12; B32B 7/14; B32B 2262/00;
        B32B 2262/02; B32B 2262/0253; B32B
        2305/00; B32B 2305/38; B32B 2307/00;
        B32B 2307/30; B32B 2307/50; B32B
        2307/514; B32B 2307/516; B32B
        2307/518; B32B 2307/546; B32B
        2307/70; B32B 2307/718; B32B 2323/00;
        B32B 2323/04; B32B 2323/043; B32B
        2323/046; Y10T 428/31855; Y10T
        428/21909; Y10T 428/31938; Y10T
        428/24273; Y10T 428/24298; Y10T
        428/24306; Y10T 428/24314; Y10T
        428/24322; Y10T 428/24058; Y10T
        428/24074; Y10T 428/24091; Y10T
        428/24116; Y10T 428/241124; Y10T
        428/24099; Y10T 428/24331; Y10T
        428/31909; Y10T 428/31913; Y10T
        428/24124; Y10T 428/24132; Y10T
        428/24942; Y10T 428/2495; Y10T
        428/24959; Y10T 428/24967; Y10T
        428/24975; Y10T 428/26; Y10T 428/263;
        Y10T 428/264; Y10T 428/265; Y10T
        428/266; Y10T 428/269; Y10T 428/27;
        Y10T 428/273; Y10T 428/28; Y10T
        428/2813; Y10T 428/2817; Y10T
        428/2826; Y10T 428/2848; Y10T
        428/2852; Y10T 428/2878; Y10T
        442/608; Y10T 442/609; Y10T 442/611;
        Y10T 442/10; Y10T 442/184; Y10T
        442/186; Y10T 442/197; Y10T 442/60;
        Y10T 442/637; Y10T 442/638; Y10T
        442/659; Y10T 442/66; Y10T 442/662;
        Y10T 442/663; Y10T 442/671; Y10T
        442/674–679; Y10T 442/61; Y10T
        442/614; Y10T 442/619; Y10T 442/62;
        Y10T 442/621; Y10T 442/622; Y10T
        442/626; Y10T 4428/643; Y10T
        4428/659; Y10T 4428/668; Y10T
        4428/671; Y10T 4428/674; Y10T
        4428/678; Y10T 4428/696; Y10T
        4428/697; D04H 13/00; D04H 13/02;
        D04H 3/00; D04H 3/005; D04H 3/007;
        D04H 3/02; D04H 3/04; D04H 3/045;
        D04H 3/08; D04H 3/14; D04H 3/147;
        D04H 1/00; D04H 1/40; D04H 1/42;
        D04H 1/4382; D04H 1/4391; D04H 1/54;
        D04H 1/5405; D04H 1/541; D04H 1/542;
        D04H 1/544; D04H 1/554; D04H 1/555;
        D04H 1/556; D04H 1/559; D04H 1/70;
        D04H 1/74; D04H 3/016; D04H 3/018;
        D04H 3/16; D04H 3/163; D04H 5/00;
        D04H 5/06; D04H 5/08
    USPC .............. 428/500, 515, 516, 523, 131, 105,
        428/134–138, 107–110, 112–114,
        428/212–216, 219, 220, 332, 334–337,
        428/339–341, 343, 346, 347, 349, 354,
        428/355, 355 R, 355 EN; 442/1, 50, 51,
        442/57, 327, 361, 362, 381–384, 392,
        442/394–399, 334–337, 340, 344–347,
        442/351, 366, 389, 414, 415
    See application file for complete search history.

(56) References Cited

U.S. PATENT DOCUMENTS

| 5,861,202 | A |   | 1/1999  | Kimura et al. |
| 6,033,509 | A | * | 3/2000  | Miyamoto ............... B32B 3/10 |
|           |   |   |         | 156/164 |
| 6,106,924 | A | * | 8/2000  | Yamazaki ............... B32B 27/20 |
|           |   |   |         | 428/136 |
| 6,127,293 | A |   | 10/2000 | Kimura et al. |
| 2011/0085749 | A1 | * | 4/2011 | Frei ........................ B32B 5/022 |
|           |   |   |         | 428/109 |

FOREIGN PATENT DOCUMENTS

| JP | 06207359 A | * | 7/1994 |
| JP | 08047994 |   | 2/1996 |
| JP | 08169076 |   | 7/1996 |
| JP | 10128927 |   | 5/1998 |
| JP | 10128927 A | * | 5/1998 |
| JP | 11156986 |   | 6/1999 |
| JP | 11156986 A | * | 6/1999 |
| JP | 2983584 B2 |   | 11/1999 |
| JP | 2003236964 A | * | 8/2003 | ............... B32B 5/26 |
| JP | 2004076237 A |   | 3/2004 |
| JP | 2004216701 A | * | 8/2004 |
| JP | 2011174201 A |   | 9/2011 |

OTHER PUBLICATIONS

Translation of JP 06-207359 A. Translated May 2005. (Year: 2005).*

(56) References Cited

OTHER PUBLICATIONS

Machine translation (Espacenet) of JP 2003-236964 A. Translated Mar. 10, 2017. (Year: 2017).*
Machine translation (Espacenet) of JP 11-156986 A. Translated Oct. 3, 2017. (Year: 2017).*
Machine translation (Espacenet) of JP 10-128927 A. Translated Oct. 3, 2017. (Year: 2017).*
International Search Report for Application No. PCT/JP2014/076836 dated Dec. 9, 2014.

* cited by examiner

| SAMPLE NUMBER | PRODUCT NAME | LAYER COMPOSITION RATIO (%) | MASS PER UNIT AREA (g/m²) | TENSILE STRENGTH (N/50mm) | | CANTILEVER (mm) | | |
|---|---|---|---|---|---|---|---|---|
| - | - | - | - | MD | CD | MD | CD | AVERAGE VALUE |
| S1 |  | 26/48/26 | 4 | 18 | 15 | 5 | 7 | 6 |
| S2 |  | 26/48/26 | 5 | 25 | 23 | 6 | 10 | 8 |
| S3 |  | 26/48/26 | 8 | 32 | 41 | 15 | 25 | 20 |
| S4 |  | 10/80/10 | 10 | 46 | 50 | 50 | 60 | 55 |
| S5 |  | 16/68/16 | 10 | 49 | 44 | 45 | 59 | 52 |
| S6 |  | 26/48/26 | 10 | 44 | 48 | 20 | 52 | 36 |
| S7 |  | 26/48/26 | 13 | 62 | 75 | 38 | 48 | 43 |
| S8 | 3S(T) | 13/74/13 | 18 | 85 | 98 | 50 | 75 | 63 |
| S9 | S(F)EL | 13/74/13 | 25 | 125 | 152 | 62 | 78 | 70 |
| S10 | HS(T) | 11/78/11 | 35 | 221 | 250 | 61 | 94 | 78 |

NONWOVEN FABRIC AND REINFORCING LAMINATE

CROSS-REFERENCE TO RELATED APPLICATION

This application is a national phase entry under 35 U.S.C. § 371 of International Application No. PCT/JP2014/076836, filed Oct. 7, 2014, which claims priority to Japanese Patent Application No. 2013-217739 filed on Oct. 18, 2013, the disclosures of which are incorporated herein by reference.

TECHNICAL FIELD

The present invention relates to a nonwoven fabric in which uniaxially oriented bodies each made of a thermoplastic resin are warp-weft laminated with their orientation axes intersecting each other, and to a reinforcing laminate obtained by stacking the nonwoven fabric on a reinforcing target material so that the nonwoven fabric is used as a strengthening material.

BACKGROUND ART

Patent Document 1 describes a method for producing a reticular nonwoven fabric as a laminate of a uniaxially oriented body (longitudinal web) that is made of a thermoplastic resin and is oriented in a lengthwise direction (in a direction parallel to the length thereof) and a uniaxially oriented body (transverse web) that is made of a thermoplastic resin and is oriented in a widthwise direction (in a direction parallel to the width thereof). This reticular nonwoven fabric is produced by pressing the laminate of the longitudinal web and the transverse web formed independently of each other and by heating the laminate so that the longitudinal web and the transverse web are united.

REFERENCE DOCUMENT LIST

Patent Document

Patent Document 1: Japanese Patent No. 2983584

SUMMARY OF THE INVENTION

Problems to be Solved by the Invention

Nonwoven fabrics of this type have features of being thin, lightweight, and high strength. Such a nonwoven fabric is stacked on a reinforcing target material to be used as a strengthening material in many cases, and therefore, needs to have high strength and durability. Accordingly, the nonwoven fabric has a relatively high bending resistance. In the case of being used as a packaging material alone, some of such nonwoven fabrics are susceptible to damage, which might degrade marketability thereof, and are unsuitable for flowers, vegetables, fruits, etc., that is, have a limited range of application. Nonwoven fabrics show excellent properties in, for example, air permeability, water resistance, and chemical resistance, but still have room for improvement in application requiring high flexibility, high elasticity, and pleasant texture, such as medical application and sanitary materials.

In addition, in the case of using a nonwoven fabric as a strengthening material, because of a relatively high bending resistance described above, the nonwoven fabric has resilience and is not always suitable for strengthening a stereoscopic member having an uneven surface. In the case of using a nonwoven fabric for strengthening products to be used on people (e.g., cosmetics and infant wipe products to be used on people), further improvement is required in terms of flexibility, elasticity, and pleasantness of texture. In the case of using a nonwoven fabric for strengthening products to be used to objects (e.g., wipes for cleaning or wiping), further improvement is required in terms of pick up properties and wiping deposits.

The present invention has been made in view of the foregoing circumstances, and has a purpose of providing a nonwoven fabric and a reinforcing laminate that can enhance flexibility, elasticity, and pleasantness of texture, and in the case of being used alone, can increase range of application, and in the case of being used as a strengthening material, can enhance followability to the surface shape of a strengthening target material to enlarge an applicable range of a reinforcing target material in addition to the above advantages.

Means for Solving the Problems

In an aspect of the present invention, a nonwoven fabric is a reticular nonwoven fabric in which uniaxially oriented bodies each including a thermoplastic resin layer and first and second adhesive layers stacked on both surfaces of the thermoplastic resin layer and having melting points lower than that of a thermoplastic resin constituting the thermoplastic resin layer are warp-weft laminated with the first or second adhesive layer interposed between the uniaxially oriented bodies in such a manner that orientation axes of the uniaxially oriented bodies intersect each other, the nonwoven fabric has a mass per unit area of 5 to 13 $g/m^2$, a layer composition ratio of the first adhesive layer, the thermoplastic resin layer, and the second adhesive layer in each of the uniaxially oriented bodies is 20/60/20 to 30/40/30, and an average value of bending resistances by a cantilever method in a longitudinal direction and a transverse direction of the nonwoven fabric is less than or equal to 50 mm.

In another aspect of the present invention, a reinforcing laminate using the nonwoven fabric stacked on a reinforcing target material and is used as a strengthening material is provided.

Effects of the Invention

According to the present invention, the nonwoven fabric has a mass per unit area of 5 to 13 $g/m^2$, a layer composition ratio in each of the uniaxially oriented bodies is 20/60/20 to 30/40/30, and an average value of bending resistances by a cantilever method in a longitudinal direction and a transverse direction of the nonwoven fabric is less than or equal to 50 mm. Thus, in the case of using the nonwoven fabric alone, flexibility, elasticity, and pleasantness of texture thereof can be enhanced. In the case of using the nonwoven fabric as a strengthening material, followability to a surface shape of a reinforcing target material can be enhanced.

MODE FOR CARRYING OUT THE INVENTION

Embodiments of the present invention will be described with reference to the drawings.

First Embodiment

Figure 1:
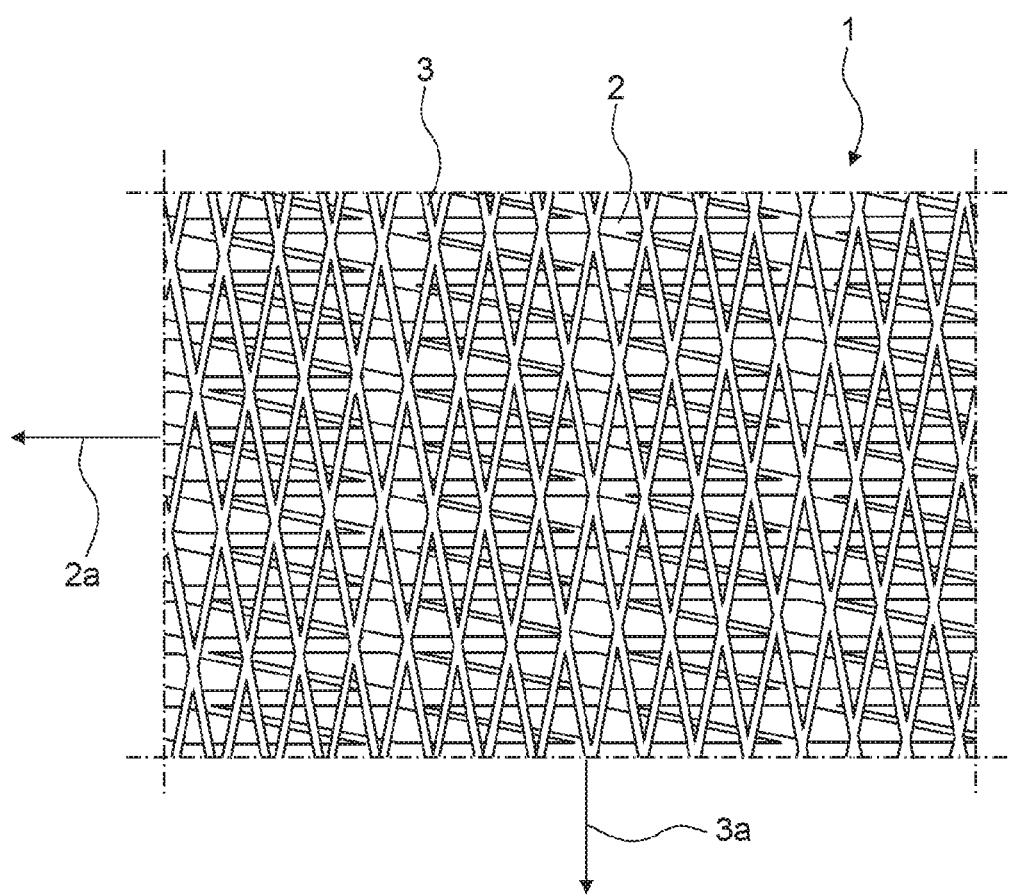
FIG. 1 is a plan view illustrating a nonwoven fabric according to a first embodiment of the present invention.

FIG. 1 illustrates a nonwoven fabric according to a first embodiment of the present invention. In a nonwoven fabric 1, a split web 2 and a slit web 3 are warp-weft laminated with an orientation axis 2a of the split web 2 and an orientation axis 3a of the slit web 3 intersecting each other. The split webs 2 and 3 are joined together by face-bonding adjacent portions thereof.

Figure 2A:
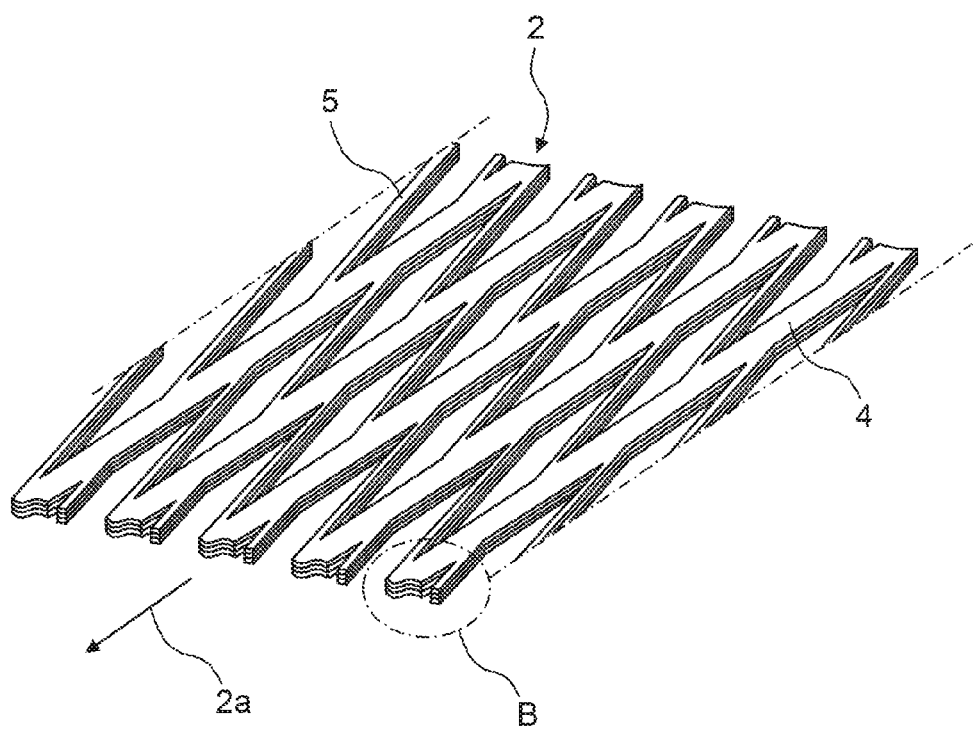
FIG. 2A is a perspective view illustrating an example configuration of a uniaxially oriented body constituting the nonwoven fabric illustrated in FIG. 1.
Figure 3A:
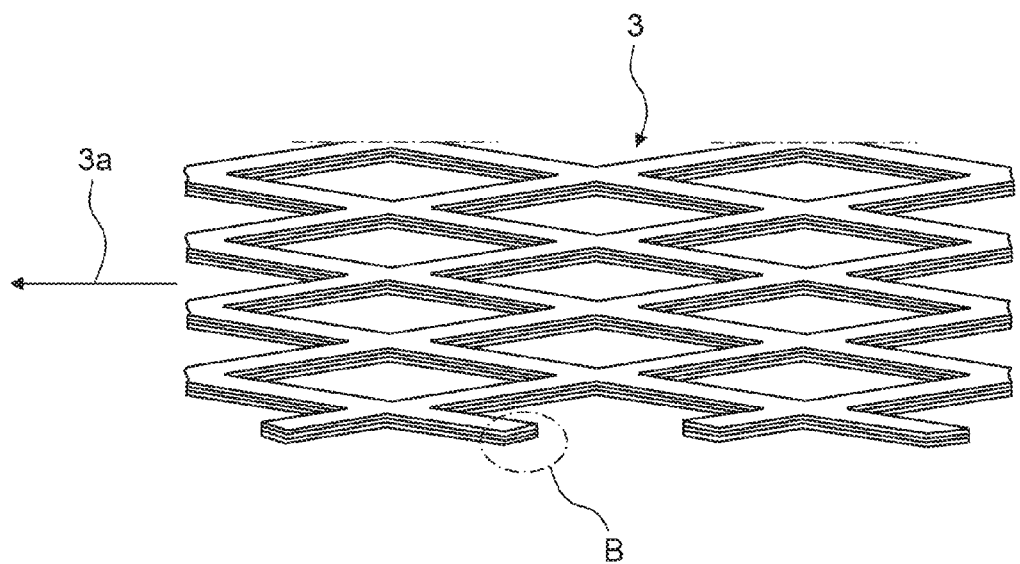
FIG. 3A is a perspective view illustrating an example configuration of a uniaxially oriented body constituting the nonwoven fabric illustrated in FIG. 1.

FIGS. 2A and 3A respectively illustrate the split web 2 and the slit web 3 constituting the nonwoven fabric 1 illustrated in FIG. 1. The split web 2 illustrated in FIG. 2A is formed by uniaxially stretching a thermoplastic resin film in a lengthwise direction (in an axial direction of the orientation axis 2a of the split web 2), splitting the film in the lengthwise direction, and enlarging the width of the film. For the split web 2, a thermoplastic resin, such as high-density polyethylene, and thermoplastic resins, such as first low-density polyethylene and second low-density polyethylene, having melting points lower than that of the former thermoplastic resin are used.

Specifically, a multilayer film (uniaxially oriented body) which is fabricated by a molding method such as a multilayer T-die method and in which the first low-density polyethylene and the second low-density polyethylene are stacked on both surfaces of the high-density polyethylene, is stretched at least threefold in the lengthwise direction (longitudinal direction). Thereafter, the multilayer film is split (as a split process) in the same direction in a cross-stitch pattern using a splitter and is formed into a reticular film. The width of the resulting film is then enlarged to a predetermined width. Through the enlargement of the width, a trunk fiber 4 and a branch fiber 5 are formed so that a reticular body as illustrated in the drawings is obtained. The split web 2 has a relatively high strength in the lengthwise direction across the overall width thereof.

Figure 2B:
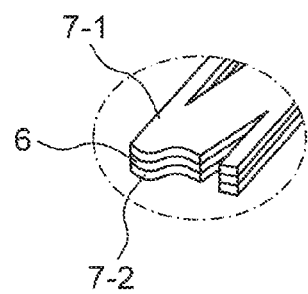
FIG. 2B is a perspective view illustrating a part of FIG. 2A in an enlarged manner.

FIG. 2B is an enlarged perspective view illustrating a region B enclosed with a dash-dot line in FIG. 2A. The split web 2 has a three-layer structure in which both surfaces of the thermoplastic resin layer 6 are respectively coated with thermoplastic resin layers 7-1 and 7-2 having melting points lower than that of a thermoplastic resin constituting the thermoplastic resin layer 6. The thermoplastic resin layers 7-1 and 7-2 function as adhesive layers (first and second adhesive layers) for bonding the webs in warp-weft lamination of the split web 2 and the slit web 3 for forming the nonwoven fabric 1.

The slit web 3 illustrated in FIG. 3A is formed by forming a large number of slits in a thermoplastic resin film in a widthwise direction (in the axial direction of the orientation axis 3a of the slit web 3) and then uniaxially stretching the film in the widthwise direction. Specifically, the slit web 3 is formed by forming discontinuous parallel slits such as a cross-stitch pattern with, for example, thermal cutting blades in the widthwise direction (transverse direction) in a portion of the multilayer film except both edge portions, and then by stretching the film in the widthwise direction. The slit web 3 has a relatively high strength in the widthwise direction.

Figure 3B:
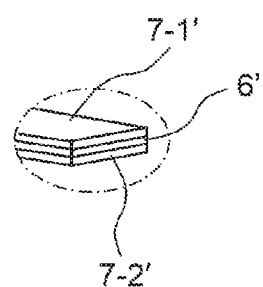
FIG. 3B is a perspective view illustrating a part of FIG. 3A in an enlarged manner.

FIG. 3B is an enlarged perspective view of a region B enclosed with a dash-dot line in FIG. 3A. The slit web 3 has a three-layer structure in which both surfaces of a thermoplastic resin layer 6' are respectively coated with thermoplastic resin layers 7-1' and 7-2' having melting points lower than a thermoplastic resin constituting the thermoplastic resin layer 6'. The thermoplastic resin layers 7-1' and 7-2' function as adhesive layers (first and second adhesive layers) for bonding the webs in warp-weft lamination of the split web 2 and the slit web 3 for forming the nonwoven fabric 1.

<Manufacturing Method>

Figure 4:
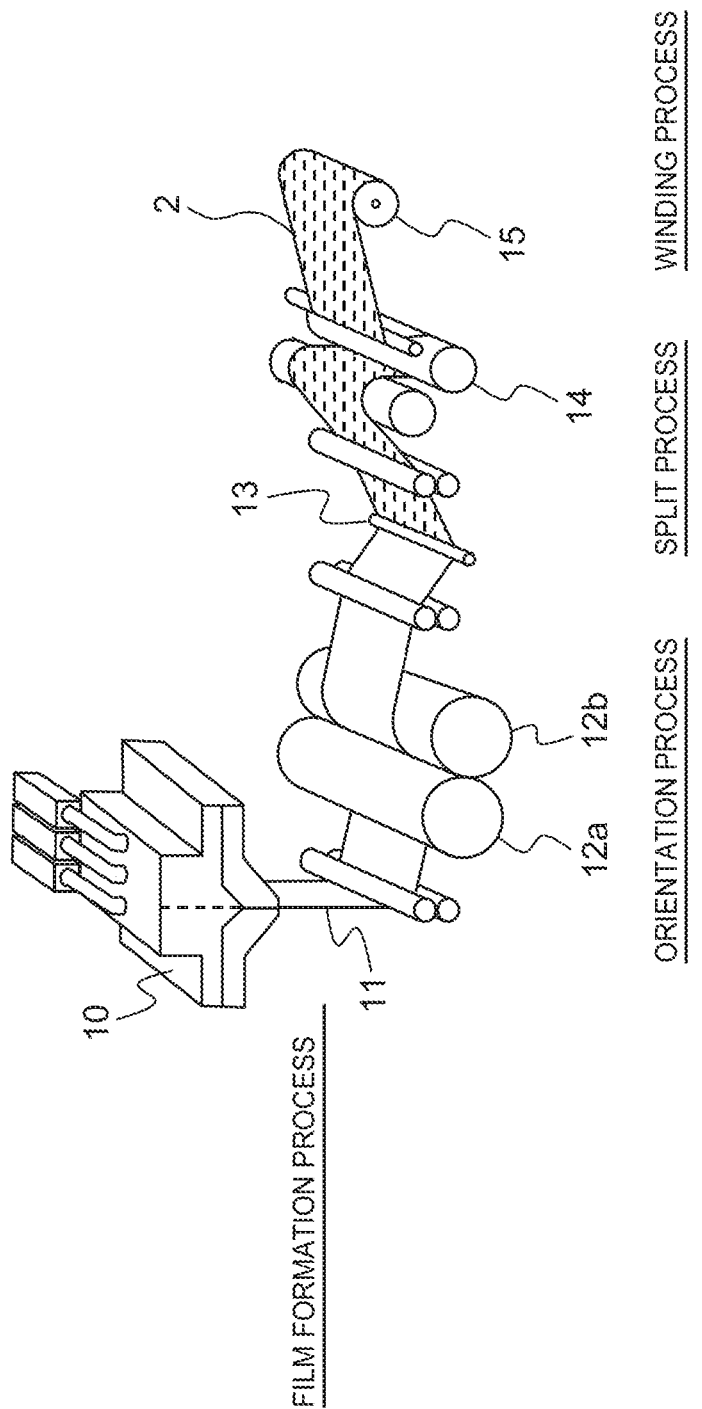
FIG. 4 is a perspective view illustrating a method for producing a uniaxially oriented body illustrated in FIG. 2A and FIG. 2B.
Figure 5:
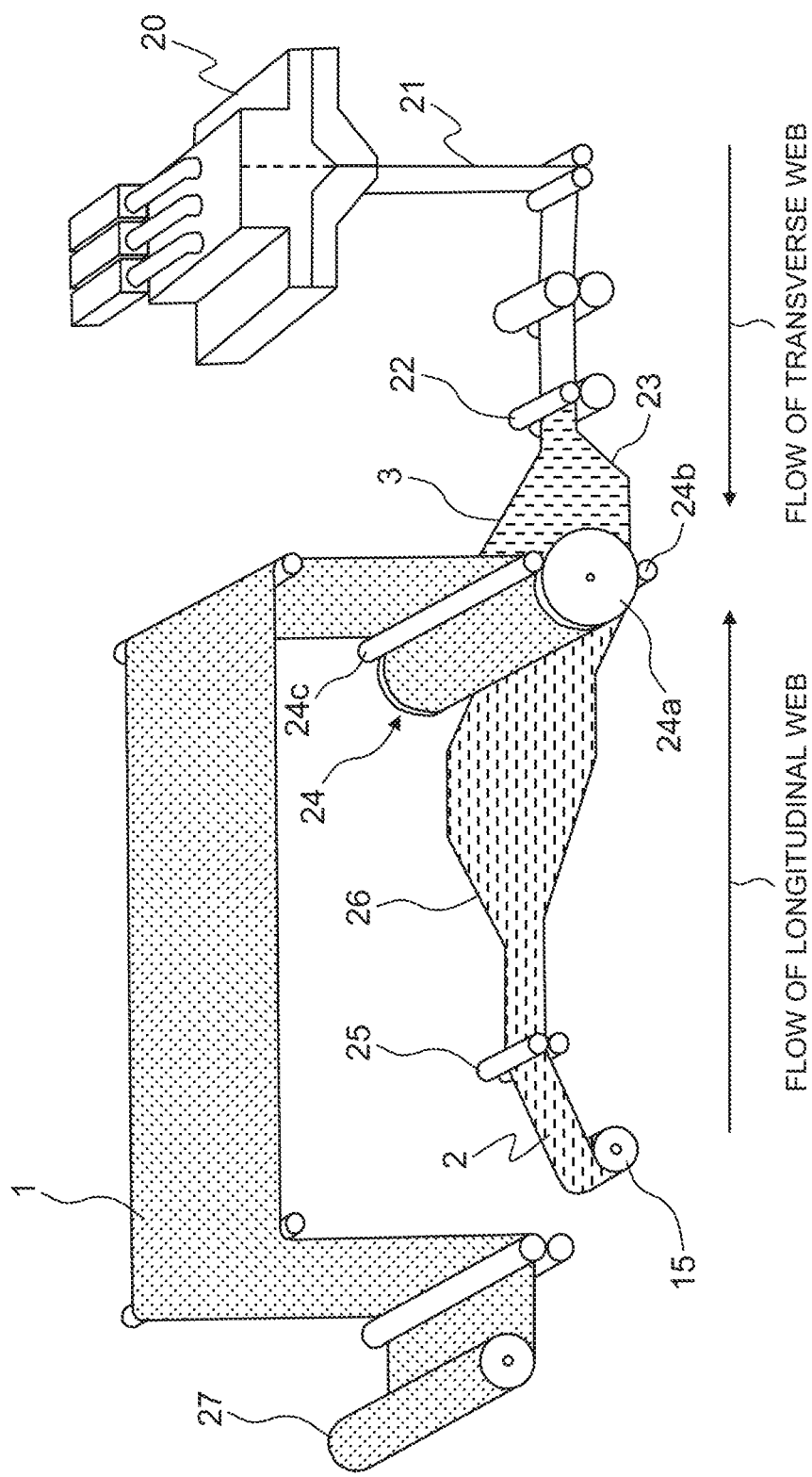
FIG. 5 is a perspective view illustrating a first method for producing a nonwoven fabric according to the first embodiment of the present invention.

A method for producing the nonwoven fabric 1 illustrated in FIGS. 1, 2A, 2B, 3A, and 3B will be described with reference to FIGS. 4 and 5. FIG. 4 schematically illustrates a method for producing the split web 2. FIG. 5 schematically illustrates a method for producing the nonwoven fabric 1 by stacking the slit web 3 on the split web 2.

As illustrated in FIG. 4, the split web 2 is produced mainly through a film formation process of producing a multilayer film, an orientation process of orienting the multilayer film, a split process of splitting the oriented multilayer film in a direction parallel to the orientation axis, and a winding process of winding the split film, for example.

In this example, in the process of producing a multilayer film, molten resins that are a thermoplastic resin, such as low-density polyethylene, having a low melting point and serving as first and second adhesive layers and a thermoplastic resin layer of, for example, high-density polyethylene are respectively supplied to different manifolds in a flat die of an extruder 10. These resins merge and are joined together immediately before a die lip to form a multilayer film 11. The flow rates of the molten resins and the thickness of a final product are adjusted by adjusting a choke bar in the die and the lip of the die.

In the orientation process, the multilayer film 11 is roll-oriented at a predetermined rate of orientation with respect to initial dimensions through a gap between mirror-polished cooling rollers 12a and 12b.

In the split process, the oriented multilayer film 11 is in slide contact with a splitter (rotary blade) 13 rotating at high speed so that a split process (splitting) is performed on the multilayer film 11.

The split web 2 formed by the splitting is enlarged in width to a predetermined width, then is subjected to a heat treatment in a heat treatment unit 14, and is wound to a predetermined length in the winding process, and then finally becomes a wound body 15 of the split web 2.

As illustrated in FIG. 5, the transverse web (slit web 3) is stacked on the longitudinal web (split web 2) drawn from the wound body 15 obtained as described above. The process of producing the transverse web includes a process of producing a multilayer film, a slitting process of performing slitting perpendicularly to the longitudinal direction of the multilayer film, and an orientation process of orienting the multilayer slit film. The longitudinal web is then stacked on the transverse web and these webs are thermally bonded under compression (a bonding process).

In a manner similar to the process of producing the multilayer film 11, in the process of producing a multilayer film for the slit web 3, molten resins that are a thermoplastic resin, such as low-density polyethylene, having a low melting point and serving as first and second adhesive layers and a thermoplastic resin layer of, for example, high-density polyethylene, are respectively supplied to different manifolds in a flat die of an extruder 20. These resins merge and are joined together immediately before a die lip to form a multilayer film 21. The flow rates of the molten resins and the thickness of a final product are adjusted by adjusting a choke bar in the die and the lip of the die.

In the slitting process, the thus-produced multilayer film 21 is pinched to be flattened, and then is finely oriented by rolling. Thereafter, in a widthwise slitting process 22, a cross-stitch pattern of lateral slits is formed in the film 21 perpendicularly to a traveling direction.

In the orientation process, the film 21 subjected to the slitting process is transversely oriented in a transverse orientation process 23. The thus-obtained slit web 3 (transverse web) is conveyed to a thermal bonding process 24.

On the other hand, the longitudinal web (split web 2) is fed from film material feeding rolls 25 and caused to travel at a predetermined feeding speed, and is sent to a width enlarging process 26. Then, the longitudinal web is enlarged in width several-fold by a width enlarging machine (not shown), and a heat treatment is performed when necessary. Thereafter, the longitudinal web is sent to the thermal bonding process 24 in which the longitudinal web and the transverse web are laminated with their orientation axes intersecting each other and are thermally bonded under compression. Specifically, the longitudinal web 2 and the transverse web 3 are sequentially guided to a gap between a heated cylinder 24a having a mirror-finished outer peripheral surface and mirror-finished rolls 24b and 24c and a nip pressure is applied thereto so that the longitudinal web 2 and the transverse web 3 are thermally bonded together under compression to be united. In this manner, adjacent portions of the longitudinal web 2 and the transverse web 3 that are in contact with each other are face-bonded in their entire surfaces. The thus-united longitudinal web and transverse web are conveyed to the winding process and wound therein to be a wound body 27 of the nonwoven fabric 1.

Inventors of the present invention produced samples having different masses per unit area, layer composition ratios of uniaxially oriented bodies, and average values of bending resistances by a cantilever method in a longitudinal direction and a transverse direction in the nonwoven fabric 1, and determined flexibility, elasticity, pleasantness of texture, and followability to a surface shape of a strengthening target material, for example. As a result, the inventors obtained the following results.

Figures 6, 7:
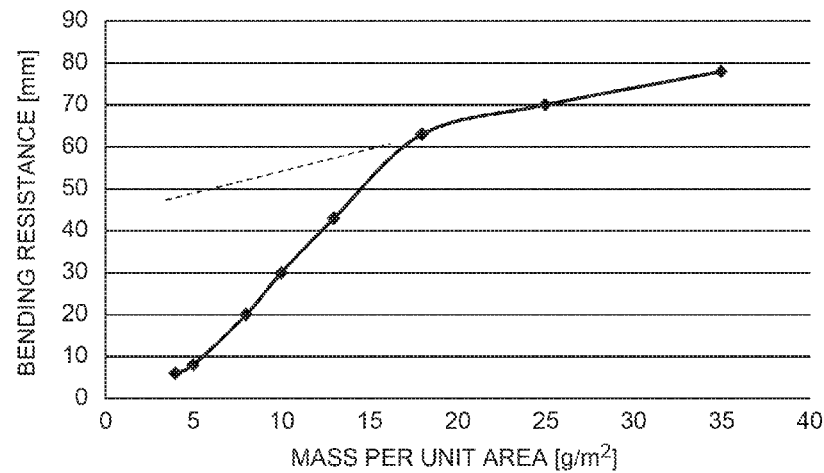
FIG. 6 is a table for describing an examination using samples with various masses per unit area of nonwoven fabrics, various layer composition ratios of uniaxially oriented bodies, and various bending resistances by a cantilever method.
FIG. 7 is a characteristic graph indicating a relationship between a mass per unit area of a nonwoven fabric and a bending resistance by a cantilever method.

In FIG. 6, a sample number S8 as a first comparative example is a product number 3S(T) of a split-fiber nonwoven fabric called Warifu (registered trademark) manufactured by JX NIPPON OIL & ENERGY CORPORATION, a sample number S9 as a second comparative example is a product number S(F)EL of the same product, and a sample number S10 as a third comparative example is a product number HS(T) of the same product.

Each of the sample numbers S8 to S10 had a relatively large mass per unit area of 18 to 35 g/m$^2$, a high ratio of high-density polyethylene (74 to 78%), and a layer composition ratio of 13/74/13 to 11/78/11. Thus, the sample numbers S8 to S10 had high strengths (tensile strengths), durabilities, and resilience. The sample numbers S8 to S10, however, had neither flexibility nor elasticity, and each had a large average value of bending resistances by a cantilever method of 63 to 78 mm. Thus, the sample numbers S8 to S10 are not suitable for applications susceptible to damage, which might degrade marketability thereof, and for applications requiring flexibility, elasticity, and pleasant texture.

On the other hand, each of sample numbers S1 to S7 was light and had a small mass per unit area of 4 to 13 g/m$^2$ and an average value of bending resistances by a cantilever method of 6 to 55 mm. The sample numbers S1 to S7 were flexible and elastic and had pleasant texture. However, in the sample number S1 having a mass per unit area of 4 g/m$^2$, a tensile strength in a longitudinal direction (MD) was MD=18 (N/50 mm) and a tensile strength in a transverse direction (CD) was CD=15 (N/50 mm), that is, the tensile strengths in both directions were less than or equal to 20N/50 mm and did not satisfy practical strength.

In the sample numbers S4 to S6, the mass per unit area was constant (10 g/m$^2$) and the layer composition ratio was varied. The sample numbers S4 and S5 were not satisfactory in terms of flexibility, elasticity, and pleasantness of texture. This is supposed to be because the sample numbers S4 and S5 had high ratios of high-density polyethylene and average values of bending resistances by a cantilever method of 55 mm and 52 mm, respectively, and thus, had bending resistance.

FIG. 7 is a graph on which masses per unit area in FIG. 6 and average values of bending resistances were extracted and plotted. As demonstrated in FIG. 7, a curve of masses per unit area has an inflection point at about 10-odd g/m$^2$, and the flexibility, elasticity, and pleasantness of texture, for example, are supposed to vary.

From results of measurements in FIGS. 7 and 6, it is found that a preferable mass per unit area for obtaining high flexibility and elasticity, pleasant texture, and a practical strength (tensile strength) is in the range from 5 to 13 g/m$^2$. It is also shown that the layer composition ratio at which desired results were obtained was 26/48/26. However, in consideration of data on other sample numbers and layer composition ratios of commercially available products, for example, no rapid change occurs with a change of about several percentages, and thus, a preferable layer composition ratio is supposed to be in the range from 20/60/20 to 30/40/30. In addition, the average value of bending resistances by a cantilever method is less than or equal to 50 mm. The sample numbers S2, S3, S6, and S7 satisfying all the above-described conditions exhibited excellent results that sufficiently achieve expected purposes.

Furthermore, each of the sample numbers S2, S3, S6, and S7 had a thickness of less than 80 μm and an aperture ratio greater than 50%. If a sample is within such numerical ranges, both elasticity (bending resistance) and strength are achieved, and elasticity can be enhanced by reducing the thickness. In addition, if the aperture ratio of the nonwoven fabric 1 is 50%, the final product is transparent enough to see the inside and has a high air permeability in the case of being used as a package, and enables a base material that is a reinforcing target material to exhibit a material texture and a quality texture thereof in the case of being used as a strengthening material. Furthermore, in the production process described above, to have a tensile strength of the nonwoven fabric 1 greater than or equal to 20 N/50 mm, the stretching ratio of each of the multilayer films 11 and 21 is preferably greater than or equal to threefold.

The nonwoven fabric 1 satisfying all the above-described conditions can be used for applications for which conventional products cannot be used. Specifically, in the case of being used alone, the nonwoven fabric 1 can be used as a packaging material for an object susceptible to damage, which might degrade marketability thereof, such as flowers, vegetables, and fruits. The nonwoven fabric 1 can also be used for applications requiring high flexibility, high elasticity, and pleasant texture, such as medical applications and sanitary materials.

In a case in which the nonwoven fabric 1 has a mass per unit area of 5 to 13 g/m$^2$, the nonwoven fabric 1 can be formed in a bag shape. In this case, although the tensile strength slightly decreases, strength sufficient for, for example, flowers, vegetables, and fruits can be obtained without the possibility of breakage of the bag.

<First Variation>

Figure 8:
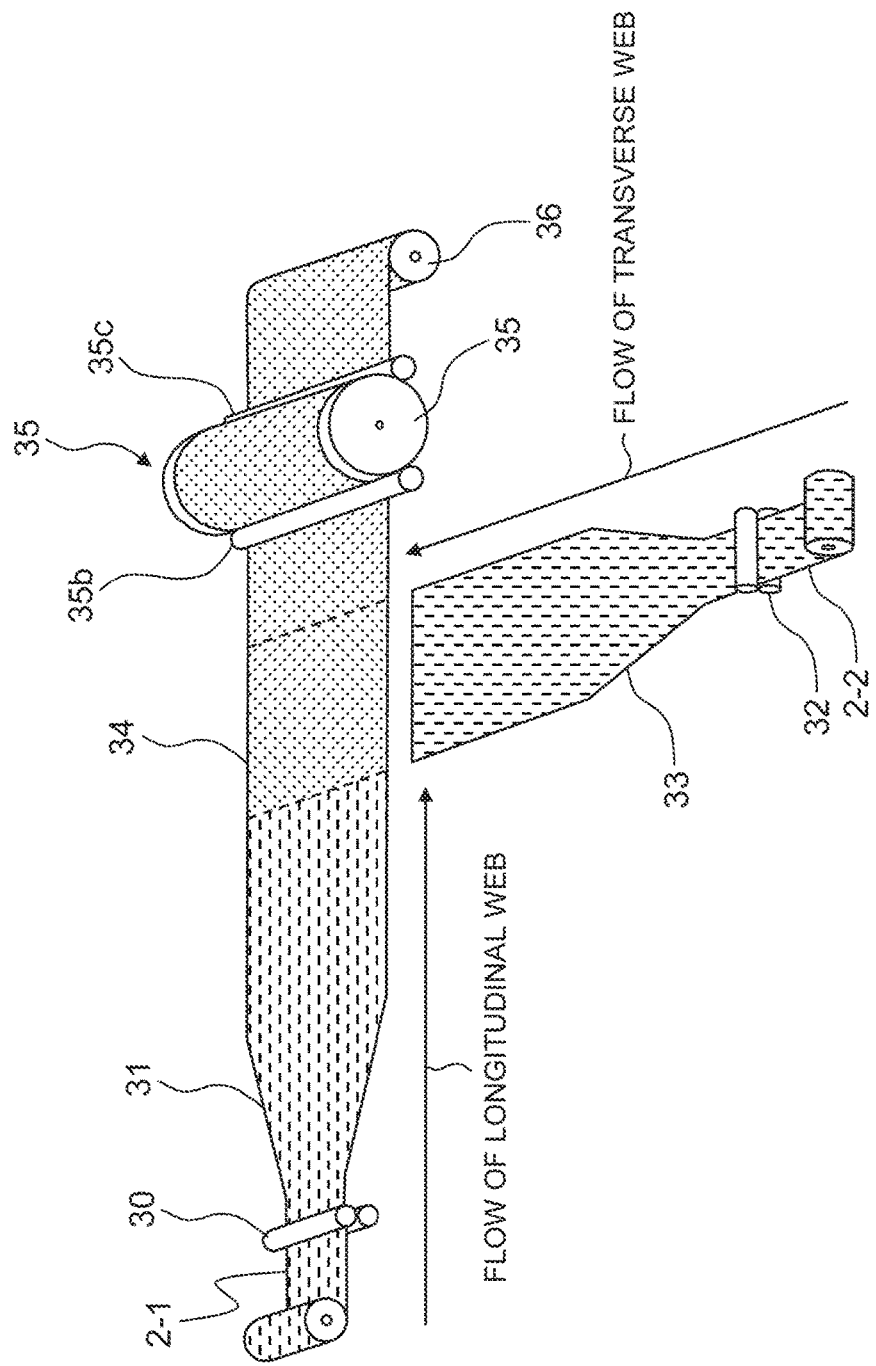
FIG. 8 is a perspective view illustrating a second method for producing a nonwoven fabric according to the first embodiment of the present invention.

FIG. 8 illustrates another production method for describing a variation of the first embodiment. In the illustrated nonwoven fabric, two split webs 2 illustrated in FIGS. 2A and 2B are laminated. In FIG. 8, a longitudinal web (split web 2-1) produced as illustrated in FIG. 4 is fed from film material feeding rolls 30 and caused to travel at a predetermined feeding speed, and is sent to a width enlarging process 31. Then, the longitudinal web is enlarged in width several-fold by a width enlarging machine (not shown), and a heat treatment is performed when necessary.

Then, in a manner similar to the longitudinal web, another split web 2-2 (transverse web) is fed from film material feeding rolls 32 and caused to travel at a predetermined feeding speed, and is sent to a width enlarging process 33. Then, the split web is enlarged in width several-fold by a width enlarging machine (not shown). After a heat treatment is performed when necessary, the split web is cut to a length equal to the width of the longitudinal web and is supplied in a direction perpendicular to a traveling film of the longitudinal web so that the longitudinal web and the transverse web are warp-weft laminated with their orientation axes perpendicularly intersecting each other and the adhesive layers thereof interposed therebetween in a lamination process 34. The warp-weft laminated longitudinal web and transverse web are sequentially guided to a gap between a heated cylinder 35a having a mirror-finished outer peripheral surface and mirror-finished rolls 35b and 35c in a thermal bonding process 35, and a nip pressure is applied thereto. In this manner, the longitudinal web and the transverse web are thermally bonded under compression. Adjacent portions of the longitudinal web and the transverse web that are in contact with each other are face-bonded in their entire surfaces. The thus-united longitudinal web and transverse web are wound in a winding process to be formed into a wound body 36 of a warp-weft laminated nonwoven fabric.

In the thus-produced nonwoven fabric, advantages similar to those of the first embodiment can be obtained by satisfying conditions of a mass per unit area (5 to 13 g/m$^2$), a layer composition ratio (20/60/20 to 30/40/30), and an average value (50 mm or less) of bending resistances by a cantilever method. In this case, it is also preferable that the thickness be less than 80 μm and the aperture ratio be greater than 50%.

<Second Variation>

In the first embodiment and the first variation, the split web 2 and the slit web 3 as uniaxially oriented bodies are warp-weft laminated. Alternatively, two pairs of parallel uniaxially oriented tapes may be laminated. In this case, the uniaxially oriented tapes are warp-weft laminated in such a manner that an orientation axis of one of the two pairs of uniaxially oriented tapes perpendicularly intersects an orientation axis of the other pair of uniaxially oriented tapes. In a manner similar to the split web 2 and the slit web 3, the uniaxially oriented tapes are obtained by uniaxially orienting a three-layer film in which both surfaces of a thermoplastic resin layer are respectively coated with first and second adhesive layers (thermoplastic resin) having melting points lower than a thermoplastic resin constituting the thermoplastic resin layer in a lengthwise or widthwise direction, and cutting the three-layer film to obtain multilayer stretched tapes.

In this manner, in the case of laminating two pairs of parallel uniaxially oriented tapes, similar advantages can be obtained by satisfying all the conditions of the mass per unit area, the layer composition ratio, and the average value of bending resistances by a cantilever method equal to those of the first embodiment. It is, of course, preferable that the thickness be less than 80 μm and the aperture ratio be greater than 50%.

With the configuration as described above, flexibility, elasticity, and pleasantness of texture can be enhanced, and thus, the nonwoven fabric 1 can be used as a packaging material for applications that are susceptible to damage, which might degrade marketability thereof, such as flowers, vegetables, and fruits. The nonwoven fabric 1 can also be used for application requiring high flexibility, high elasticity, and pleasant texture, such as medical application and sanitary materials. Thus, the range of application can be enlarged.

Second Embodiment

In the first embodiment and the first and second variations thereof, the nonwoven fabric is used alone. In the second embodiment, the nonwoven fabric described above is used as a strengthening material so that a reinforcing laminate is obtained. The nonwoven fabric according to the first embodiment has a high flexibility, a high elasticity, and excellent followability (unevenness followability) to the surface shape of a reinforcing target material. Thus, the nonwoven fabric can be laminated for a reinforcing target material having a stereoscopic shape that is difficult to be strengthened, e.g., for strengthening urethane having an uneven surface. The nonwoven fabric can follow other shapes in addition to a flat surface, and is applicable to a material for strengthening various reinforcing target materials.

In addition, in the case of being used for strengthening products to be used for people, such as cosmetics and infant products, since the strengthening material is flexible and elastic, pleasantness of texture can be enhanced. Furthermore, in the case of being used for strengthening products to be used for objects, such as wipes for cleaning or wiping, the pick up abilities and wiping deposits can be enhanced for the reasons described above. Moreover, since the nonwoven fabric is thin and lightweight and has a high aperture ratio, the nonwoven fabric can strengthen a reinforcing target material while effectively using a material texture and a quality texture thereof.

REFERENCE SYMBOL LIST 1 nonwoven fabric
2 split web
2a orientation axis
3 slit web
3a orientation axis
4 trunk fiber
5 branch fiber
6, 6' thermoplastic resin layer
7-1, 7-1' adhesive layer
7-2, 7-2' adhesive layer

The invention claimed is:

1. A nonwoven fabric comprising a first reticular film and a second reticular film stacked on the first reticular film, wherein
the first reticular film comprises a first uniaxially oriented body having first fibers having first and second adhesive layers formed on first and second surfaces of a first thermoplastic resin layer and arranged parallel to each other in a longitudinal direction, and second fibers connecting adjacent first fibers and having a same layer construction as the first fibers, wherein the first and second adhesive layers have melting points below a melting point of the first thermoplastic resin layer,
the second reticular film comprises a second uniaxially oriented body having third fibers having third and fourth adhesive layers formed on first and second surfaces of a second thermoplastic resin layer and arranged parallel to each other in a widthwise direction, and fourth fibers connecting adjacent third fibers and having a same layer construction as the third fibers, wherein the third and fourth adhesive layers have melting points below a melting point of the second thermoplastic resin layer,
the nonwoven fabric has a mass per unit area of 5 to less than 10 g/m$^2$,
a layer composition ratio of the first adhesive layer, the first thermoplastic resin layer, and the second adhesive layer in the first reticular film, and a layer composition ratio of the third adhesive layer, the second thermoplastic resin layer, and the fourth adhesive layer are 20/60/20 to 30/40/30,
the nonwoven fabric has a thickness less than 80 μm and an aperture ratio greater than 50%, and
an average value of bending resistances by a cantilever method in a longitudinal direction and a transverse direction of the nonwoven fabric is less than or equal to 50 mm.

2. The nonwoven fabric of claim 1, wherein
each of the first and second thermoplastic resin layers includes high-density polyethylene, and
each of the first, second, third and fourth adhesive layers includes low-density polyethylene.

3. A reinforcing laminate, wherein
the nonwoven fabric of claim 2 is stacked on a reinforcing target material and is used as a strengthening material.

4. A reinforcing laminate, wherein
the nonwoven fabric of claim 1 is stacked on a reinforcing target material and is used as a strengthening material.

5. The nonwoven fabric of claim 1, wherein the first fibers and the second fibers have different widths, and the third fibers and the fourth fibers have substantially the same width.

* * * * *